(12) United States Patent
Oliver (10) Patent No.: US 8,098,939 B2
(45) Date of Patent: Jan. 17, 2012

(54) ADVERSARIAL APPROACH FOR IDENTIFYING INAPPROPRIATE TEXT CONTENT IN IMAGES

(75) Inventor: Jonathan James Oliver, Kew (AU)

(73) Assignee: Trend Micro Incorporated, Tokyo (JP)

(*) Notice: Subject to any disclaimer, the term of this patent is extended or adjusted under 35 U.S.C. 154(b) by 1265 days.

(21) Appl. No.: 11/803,963

(22) Filed: May 16, 2007

(65) Prior Publication Data

US 2008/0131005 A1 Jun. 5, 2008

Related U.S. Application Data (60) Provisional application No. 60/872,928, filed on Dec. 4, 2006.

(51) Int. Cl.
*G06K 9/72* (2006.01)

(52) U.S. Cl. .......................... 382/229; 382/218; 382/203

(58) Field of Classification Search .................. 382/229, 382/203, 217, 218
See application file for complete search history.

(56) References Cited

U.S. PATENT DOCUMENTS

| 5,557,689 | A * | 9/1996 | Huttenlocher et al. | 382/177 |
| 5,687,253 | A * | 11/1997 | Huttenlocher et al. | 382/177 |
| 5,745,600 | A * | 4/1998 | Chen et al. | 382/218 |
| 6,249,604 | B1 * | 6/2001 | Huttenlocher et al. | 382/174 |
| 7,778,464 | B2 * | 8/2010 | Lee et al. | 382/185 |
| 2005/0216564 | A1 | 9/2005 | Myers et al. | |
| 2008/0159585 | A1 * | 7/2008 | True et al. | 382/100 |

OTHER PUBLICATIONS

Chen et al. "Detecting and Locating Partially Specified Keywords in Scanned Images Using Hidden Markov Models." Proceedings of the Second International Conference on Document Analysis and Recognition, Oct. 20, 1993, 6 pages.*

Gatos et al. "A Segmentation-free Approach for Keyword Search in Historical Typewritten Documents." Proceedings of the Eighth International Conference on Document Analysis and Recognition, Aug. 29, 2005, 5 pages.*

G S Lehal, et al. "A Shape Based Post Processor for Gurmukhi OCR", 2001 IEEE, pp. 1105-1109, Punjabi University, India.

Jeff DeCurtins, et al. "Keyword spotting via word shape recognition", Feb. 6, 1995, pp. 270-277, SPIE vol. 2422, XP 000642554.

PCT International Search Report for Application No. PCT/JP2007/071441 (4 sheets).

"Avira Warns: New Spam Wave With Anti OCR Techniques", Nov. 17, 2006, p. 1 [retrieved on Apr. 19, 2007]. Retrieved from the internet: <http://www.avira.com/en/security_news/ocr_spam_wave.html>.

"Barracuda Spam Firewell Protects Customers From Growing Incidence of Image Spam", Jul. 19, 2006, p. 1 [retrieved on Apr. 19, 2007] [retrieved from the internet: <http://www.barracudanetworks.com/ns/news_and_events/index.php?nid=105>.

(Continued)

*Primary Examiner* — Jon Chang
(74) *Attorney, Agent, or Firm* — Okamoto & Benedicto LLP (57) ABSTRACT

An adversarial approach in detecting inappropriate text content in images. An expression from a listing of expressions may be selected. The listing of expressions may include words, phrases, or other textual content indicative of a particular type of message. Using the selected expression as a reference, the image is searched for a section that could be similar to the selected expression. The similarity between the selected expression and the section of the image may be in terms of shape. The section may be scored against the selected expression to determine how well the selected expression matches the section. The score may be used to determine whether or not the selected expression is present in the image.

9 Claims, 6 Drawing Sheets

OTHER PUBLICATIONS

Optical Character Recognition from Wikipedia, the free encyclopedia; pp. 1-5, [retrieved on Apr. 19, 2007] [retrieved from the internet: <http://en.wikipedia.org/wiki/Optical_character_recognition>.

OcrPlugin—Spamassassin Wiki, Aug. 28, 2006, pp. 1-4 [retrieved on Apr. 19, 2007] [retrieved from the internet:<http://wiki.apache.org/spamassassin/OcrPlugin?action=print>.

Mehran Sahami, Susan Dumais, David Heckerman and Eric Horvitz, "A Bayesian Approach To Filtering Junk E-Mail" AAAI'98 Workshop on Learning for Text Categorization, Jul. 27, 1998, Madison, Wisconsin.

Serge Belongie, Jitendra Malik and Jan Puzicha, "Shape Matching and Object Recognistion Using Shape Contexts", Apr. 24, 2002, pp. 509-522, Transactions On Pattern Analysis And Machine Intelligence, vol. 24, No. 24. IEEE 2002.

"SunbeltBLOG: Image Spam", May 2, 2006, pp. 1-2 [retrieved on Apr. 19, 2007] [retrieved from the internet:<http://sunbeltblog.blogspot.com/2006/05/image-spam.html>.

Messagelabs website—Email Control, pp. 1-4, [retrieved on Apr. 19, 2007] [retrieved from the internet:<www.messagelabs/com/Services/Email_Services/Email_Control>.

Seunghak Lee, Iryoung Jeong and Seungjin Choi, "Dynamically Weighted Hidden Markov Model For Spam Deobfuscation", pp. 2523-2529, IJCAI-07.

Honglak Lee and Andrew Y. Ng, "Spam Deobfuscation Using A Hidden Markov Model", 8 sheets, Proceedings of the Second Conference on Email and Anti-Spam, CEAS 2005.

Eric Sven Ristad and Peter N. Yianilos, "Learning String Edit Distance", Research Report CS-TR-532-96, pp. 1-33, Oct. 1997. Department of Computer Science, Princeton University.

Edit Distance from Wikipedia, the free encyclopedia. Mar. 20, 2007, p. 1 [retrieved on May 12, 2007] [retrieved from the internet:<http://en.wikipedia.org/wiki/Edit_distance>.

Dynamic Programming Algorithm (DPA) for Edit-Distance from Monash University website, 1999, pp. 1-5 [retrieved on May 12, 2007] [retrieved from the internet:<www.csse.monash.edu.au/~lloyd/tildeAlgDS/Dynamic/Edit/>.

Jonathan Oliver, "Using Lexigraphical Distancing To Block Spam" Jan. 21, 2005, pp. 1-14, MailFrontier—Email is good again, Spam Conference.

Optical Character Recognition from Wikipedia, the free encyclopedia, pp. 1-5 [retrieved on Jul. 12, 2007] [retrieved from the internet:<http://en.wikipedia.org/wiki/Optical_character_recognition>.

Cheng-Lin Liu and Hiromichi Fujisawa, "Classification and Learning for Character Recognition: Comparison of Methods and Remaining Problems", 7 sheets [retrieved on Jul. 13, 2007] [retrieved from the internet:<www.dsi.unifi.it/NNLDAR/Papers/01-NNLDAR05-Liu.pdf>.

Open-Source Character Recognition from GOCR website, pp. 1-2 [retrieved on Jul. 13, 2007] [retrieved from the internet:<http://jocr.sourceforge.net/>.

Dynamic Programming Algorithm for Sequence Alignment, pp. 1-3 [retrieved on Aug. 9, 2007] [retrieved from the internet:<http://www.csse.monash.edu.au/~lloyd/tildeStrings/Notes/DPA.html>.

Battista Biggio, Giorgio Fumera, Ignazio Pillai and Fabio Roli, "Image Spam Filtering by Content Obscuring Detection", 5 sheets, Aug. 2-3, 2007, Fourth Conference on Email and Anti-Spam CEAS 2007, California.

Zhe Wang, William Josephson, Qin Lv, Moses Charikar and Kai Li, "Filtering Image Spam with Near-Duplicate Detection", 10 sheets, Aug. 2-3, 2007, Fourth Conference on Email and Anti-Spam CEAS 2007.

Mark Dredze, Reuven Gevaryahu and Ari Elias-Bachrach, "Learning Fast Classifiers for Image Spam", 9 sheets, Aug. 2-3, 2007, Fourth Conference on Email and Anti-Spam CEAS 2007.

Byungki Byun, Chin-Hui Lee, Steve Webb and Calton Pu, "A Discriminative Classifier Learning Approach to Image Modeling and Spam Image Identification", 9 sheets, Aug. 2-3, 2007, Fourth Conference on Email and Anti-Spam CEAS 2007.

* cited by examiner

```
TRADING ALERT!
WE SEE A RUN STARTING TO HAPPEN.
IT'S JUST BEGINNING OF 1 WEEK PROMOTION!

Trade Date:          Monday, November 20, 2006
Company:             PRG Group Inc.
Symbol:              PRGJ
Current Price:       $1.33 UP $0.19(17%) on Friday
3-Day Target:        ! $5!
Rating:              10/10
Recommendation:      STRONG BUY We want to congratulate all of our members who read our
PRGJ Trading Alert on Friday. We think the fun is just
beginning with this stock. Do not wait until it is too late!!
Remember, this is a STRONG BUY RECOMMENDATION.
```

FIG. 1

```
TRcDING ALERT!
wE sEE n RuN _T_Im TO mPPEN.
I_S JUST BEGINNING oF 1 __c__MOTION!
Trde Date:      Mo__ Nov_er 20_ 2006
, ,C_mu:        PRG om I'_
  I'_           PRGJ
Cur_nt Price:        $1.M UP $0.19(17_) m Fri_U
3_ay Taget:          ! $5!
_ig:            10/10
R__m_dati_i     STRONG BUY
we w_t_ cOn_atulne all Of our mem_n _o
fged,our PRGJ Trading A!ert on Frid_. We mink
Un I'S J'ust _I'MI'g WI'_ thI'S St_k. DO, nOt
_N__,iy! _t_i_E_oDAt1toeN! _ !. .Reme'r thiS IS ^
```

```
Spammer Terms extracted using Adversarial OCR trading
tradingalert
alert
trade
tradedate
currentprice
strongbuy
trading
tradingalert
alert
```

ADVERSARIAL APPROACH FOR IDENTIFYING INAPPROPRIATE TEXT CONTENT IN IMAGES

CROSS-REFERENCE TO RELATED APPLICATION

This application claims the benefit of U.S. Provisional Application No. 60/872,928, filed on Dec. 4, 2006, which is incorporated herein by reference in its entirety.

BACKGROUND OF THE INVENTION

1. Field of the Invention

The present invention relates generally to computer security, and more particularly but not exclusively to methods and apparatus for identifying inappropriate text content in images.

2. Description of the Background Art

Electronic mail ("email") has become a relatively common means of communication among individuals with access to a computer network, such as the Internet. Among its advantages, email is relatively convenient, fast, and cost-effective compared to traditional mail. It is thus no surprise that a lot of businesses and home computer users have some form of email access. Unfortunately, the features that make email popular also lead to its abuse. Specifically, unscrupulous advertisers, also known as "spammers," have resorted to mass emailings of advertisements over the Internet. These mass emails, which are also referred to as "spam emails" or simply "spam," are sent to computer users regardless of whether they asked for them or not. Spam includes any unsolicited email, not just advertisements. Spam is not only a nuisance, but also poses an economic burden.

Previously, the majority of spam consisted of text and images that are linked to websites. More recently, spammers are sending spam with an image containing the inappropriate content (i.e., the unsolicited message). The reason for embedding inappropriate content in an image is that spam messages can be distinguished from normal or legitimate messages in at least two ways. For one, the inappropriate content (e.g., words such as "Viagra", "free", "online prescriptions," etc.) can be readily detected by keyword and statistical filters (e.g., see Sahami M., Dumais S., Heckerman D., and Horvitz E., "A Bayesian Approach to Filtering Junk E-mail," AAAI'98 Workshop on Learning for Text Categorization, 27 Jul. 1998, Madison, Wis.). Second, the domain in URLs (uniform resource locators) in the spam can be compared to databases of known bad domains and links (e.g., see Internet URL www dot surbl dot org).

In contrast, a spam email where the inappropriate content and URLs are embedded in an image may be harder to classify because the email itself does not contain obvious spammy textual content and does not have a link/domain that can be looked up in a database of bad links/domains.

Using OCR (optical character recognition) techniques to identify spam images (i.e., images having embedded spammy content) have been proposed because OCR can be used to identify text in images. In general, use of OCR for anti-spam applications would involve performing OCR on an image to extract text from the image, scoring the extracted text, and comparing the score to a threshold to determine if the image contains spammy content. Examples of anti-spam applications that may incorporate OCR functionality include the SpamAssassin and Barracuda Networks spam filters. Spammers responded to OCR solutions in spam filters with images deliberately designed with anti-OCR features. Other approaches to combat spam images include flesh-tone analysis and use of regular expressions.

The present invention provides a novel and effective approach for identifying content in an image even when the image has anti-OCR features.

SUMMARY

In one embodiment, an expression from a listing of expressions is selected. The listing of expressions may include words, phrases, or other textual content indicative of a type of message. Using the selected expression as a reference, the image is searched for a section that could be similar to the selected expression. The similarity between the selected expression and the section of the image may be in terms of shape. The section may be scored against the selected expression to determine how well the selected expression matches the section. The score may be used to determine whether or not the selected expression is present in the image. Embodiments of the present invention may be used in a variety of applications including antispam, anti-phishing, identification of confidential information in emails, identification of communications that breach policies or regulations in emails, and other computer security applications involving identification of text content in images.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
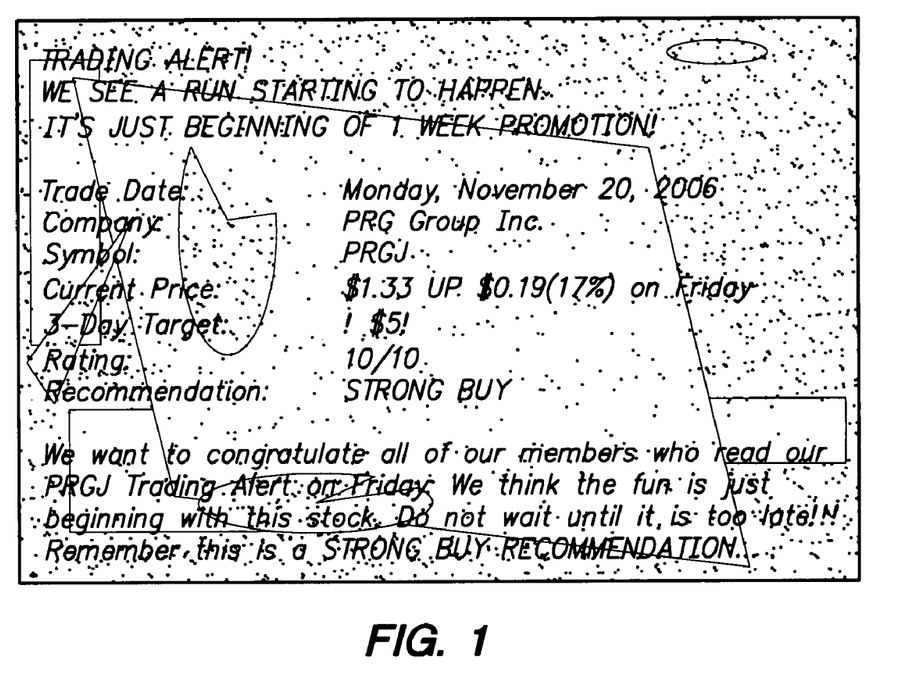
FIG. 1 shows an example image included in a spam.
Figure 2:
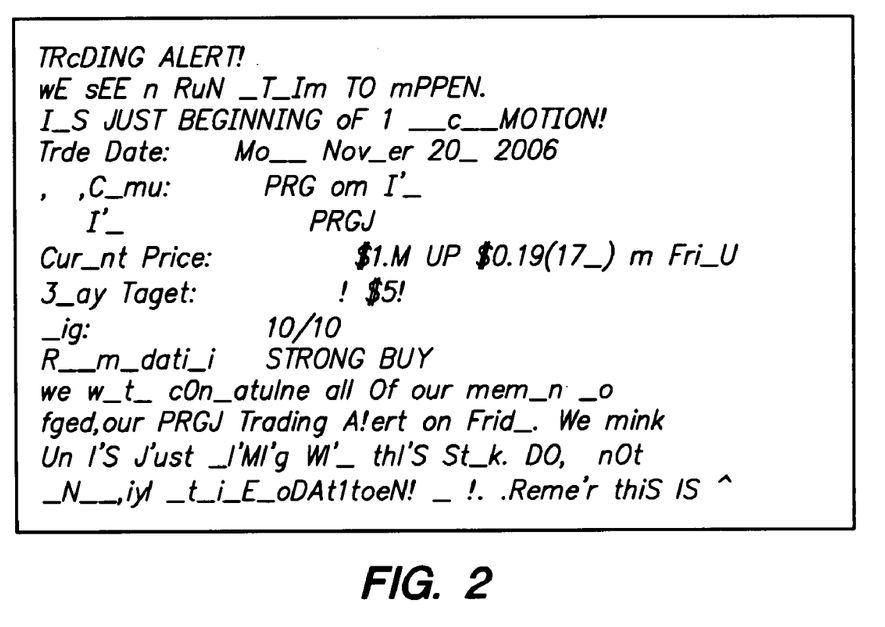
FIG. 2 shows text extracted from the image of FIG. 1 by optical character recognition.

FIG. 1 shows an example image included in a spam. The spam image of FIG. 1 includes anti-OCR features in the form of an irregular background, fonts, and color scheme to confuse an OCR module. FIG. 2 shows the text extracted from the image of FIG. 1 using conventional OCR process. The anti-OCR features fooled the OCR module enough to make the text largely unintelligible, making it difficult to determine if the image contains inappropriate content, such as those commonly used in spam emails.

Figure 3:
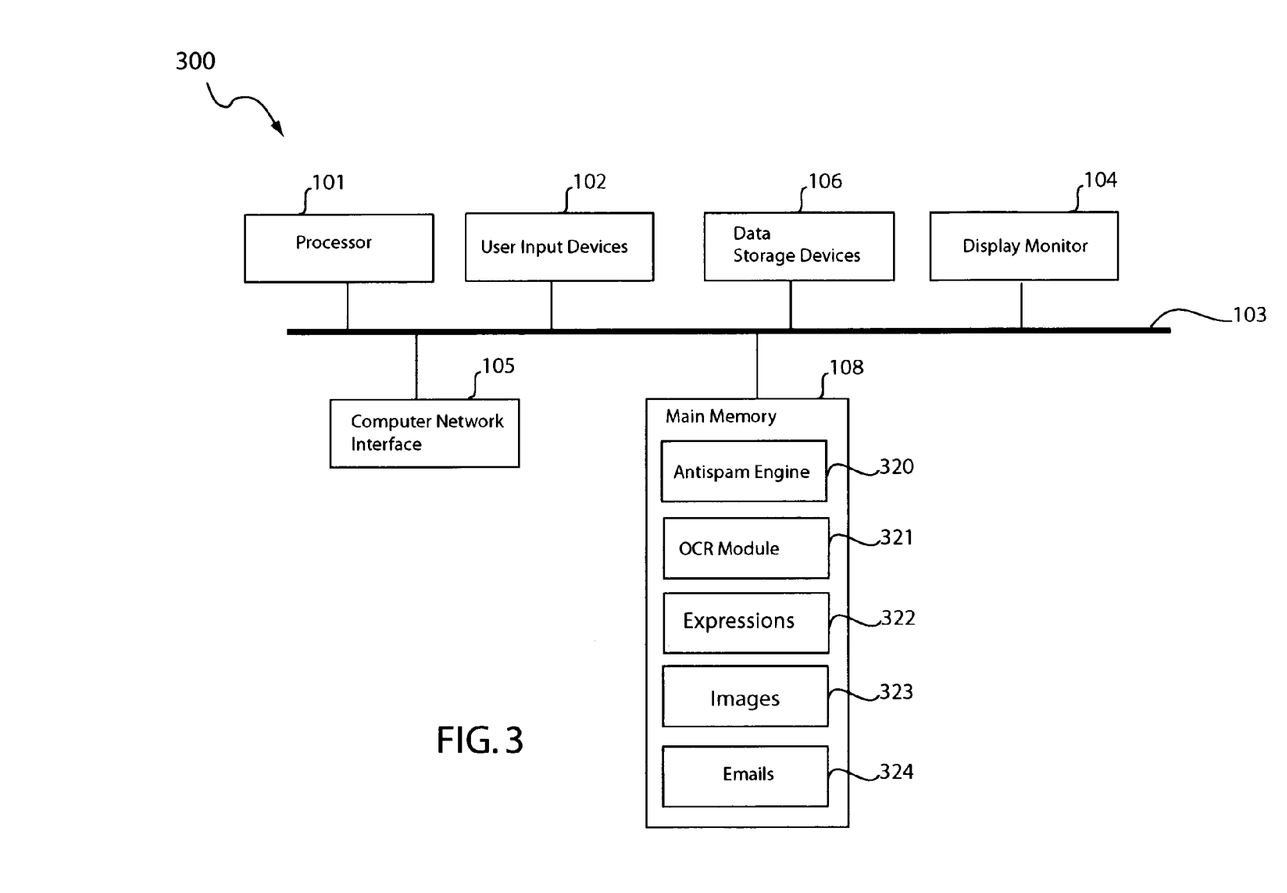
FIG. 3 shows a schematic diagram of a computer in accordance with an embodiment of the present invention.

Referring now to FIG. 3, there is shown a schematic diagram of a computer 300 in accordance with an embodiment of the present invention. The computer 300 may have less or more components to meet the needs of a particular application. The computer 300 may include a processor 101, such as those from the Intel Corporation or Advanced Micro Devices, for example. The computer 300 may have one or more buses 103 coupling its various components. The computer 300 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). In the example of FIG. 1, the main memory 108 includes an antispam engine 320, an OCR module 321, expressions 322, images 323, and emails 324. The components shown as being in the main memory 108 may be loaded from a data storage device 106 for execution or reading by the processor 101. For example, the emails 324 may be received over the Internet by way of the computer network interface 105, buffered in the data storage device 106, and then loaded onto the main memory 108 for processing by the antispam engine 320. Similarly, the antispam engine 320 may be stored in the data storage device 106 and then loaded onto the main memory 108 to provide antispam functionalities in the computer 300.

The antispam engine 320 may comprise computer-readable program code for identifying spam emails or other data with inappropriate content, which may comprise text that includes one or more words and phrases identified in the expressions 322. The antispam engine 320 may be configured to extract an image 323 from an email 324, use the OCR module 321 to extract text from the image 323, and process the extracted text output to determine if the image 323 includes inappropriate content, such as an expression 322. For example, the antispam engine 320 may be configured to determine if one or more expressions in the expressions 322 are present in the extracted text. The antispam engine 320 may also be configured to directly process the image 323, without having to extract text from the image 323, to determine whether or not the image 323 includes inappropriate content. For example, the antispam engine 320 may directly compare the expressions 322 to sections of the image 323. The antispam engine 320 may deem emails 324 with inappropriate content as spam.

The OCR module 321 may comprise computer-readable program code for extracting text from an image. The OCR module 321 may be configured to receive an image in the form of an image file or other representation and process the image to generate text from the image. The OCR module 321 may comprise a conventional OCR module. In one embodiment, the OCR module 321 is employed to extract embedded texts from the images 323, which in turn are extracted from the emails 324.

The expressions 322 may comprise words, phrases, terms, or other character combinations or strings that may be present in spam images. Examples of such expressions may include "brokers," "companyname" (particular companies), "currentprice," "5daytarget," "strongbuy," "symbol," "tradingalert" and so on. The expressions 322 may be obtained from samples of confirmed spam emails, for example.

As will be more apparent below, embodiments of the present invention are adversarial in that they select an expression from the expressions 322 and specifically look for the selected expression in the image, either directly or from the text output of the OCR module 321. That is, instead of extracting text from an image and querying whether the extracted text is in a listing of expressions, embodiments of the present invention ask the question of whether a particular expression is in an image. The adversarial approach allows for better accuracy in identifying inappropriate content in images in that it focuses search for a particular expression, allowing for more accurate reading of text embedded in images.

The emails 324 may comprise emails received over the computer network interface 105 or other means. The images 323 may comprise images extracted from the emails 324. The images 324 may be in any conventional image format including JPEG, TIFF, etc.

Figure 4:
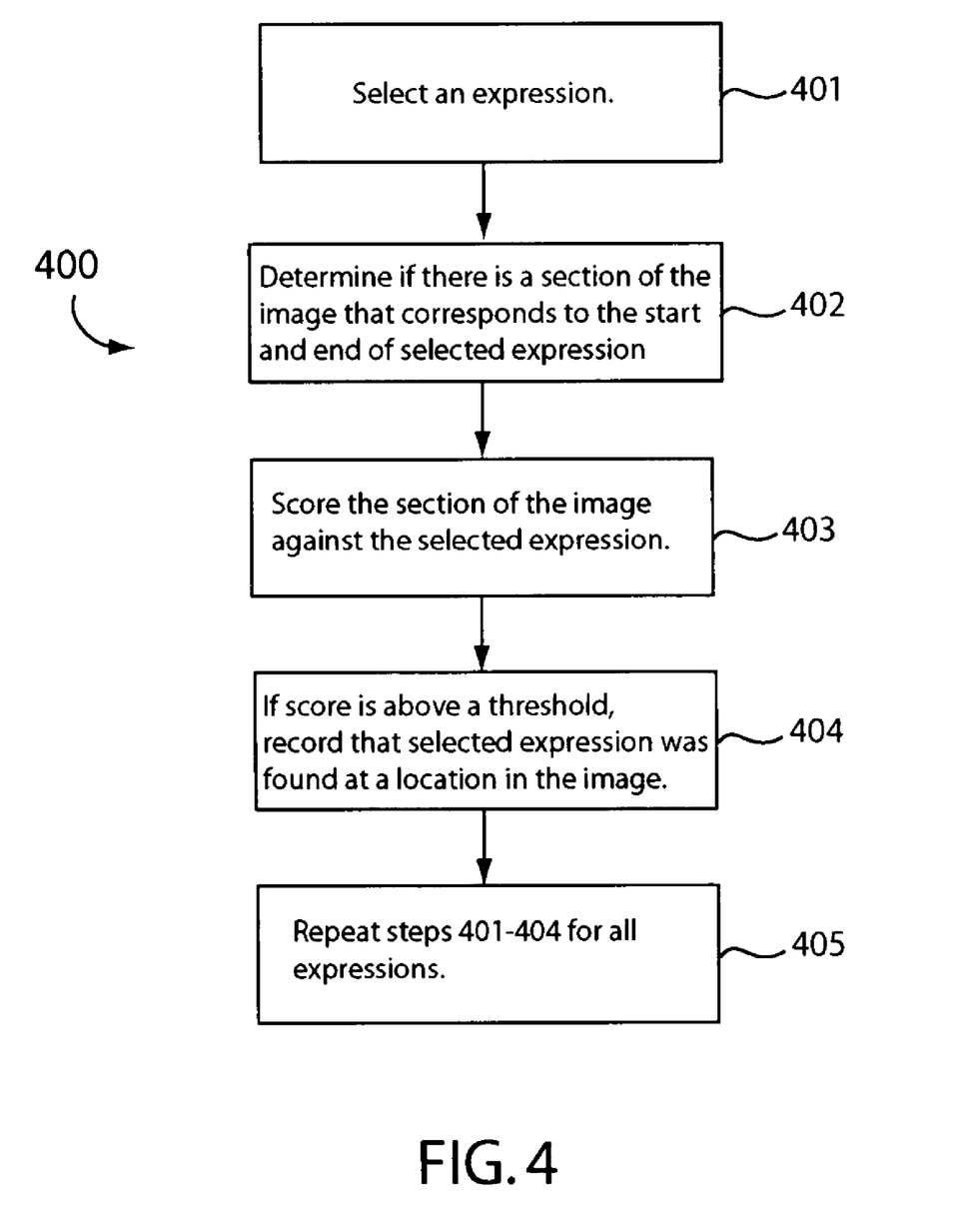
FIG. 4 shows a flow diagram of a method of identifying inappropriate text content in images in accordance with an embodiment of the present invention.

FIG. 4 shows a flow diagram of a method 400 of identifying inappropriate text content in images in accordance with an embodiment of the present invention. FIG. 4 is explained using the components shown in FIG. 3. Other components may also be used without detracting from the merits of the present invention.

The method 400 starts after the antispam engine 320 extracts an image 323 from an email 324. The antispam engine 320 then selects an expression from the expressions 322 (step 401). Using the selected expression as a reference, the antispam engine 320 determines if there is a section of the image 323 that corresponds to the start and end of the selected expression (step 402). That is, the selected expression is used as a basis in finding a corresponding section. For example, the antispam engine 320 may determine if the image 323 includes a section that looks similar to the selected expression 322 in terms of shape. The antispam engine 320 then compares the selected expression 322 to the section to determine the closeness of the selected expression 322 to the section. In one embodiment, this is performed by the antispam engine 320 by scoring the section against the selected expression (step 403). The score may reflect how close the selected expression 322 is to the section. For example, the higher the score, the higher the likelihood that the selected expression 322 matches the section. A minimum threshold indicative of the amount of correspondence required to obtain a match between an expression 322 and a section may be predetermined. The value of the threshold may be obtained and optimized empirically. If the score is higher than the threshold, the antispam engine 320 may deem the selected expression 322 as being close enough to the section that a match is obtained, i.e., the selected expression 322 is deemed found in the image 323 (step 404). In that case, the antispam engine 320 records that the selected expression was found at the location of the section in the image 323. For each image 323, the antispam engine 320 may repeat the above-described process for each of the expressions 322 (step 405). A separate scoring procedure may be performed for all identified expressions 322 to determine whether or not the image is a spam image. For example, once the expressions 322 present in the image 323 have been identified, the antispam engine 320 may employ conventional text-based algorithms to determine if the identified expressions 322 are sufficient to deem the image 323 a spam image. The email 324 from which a spam image was extracted may be deemed as spam.

Figure 5:
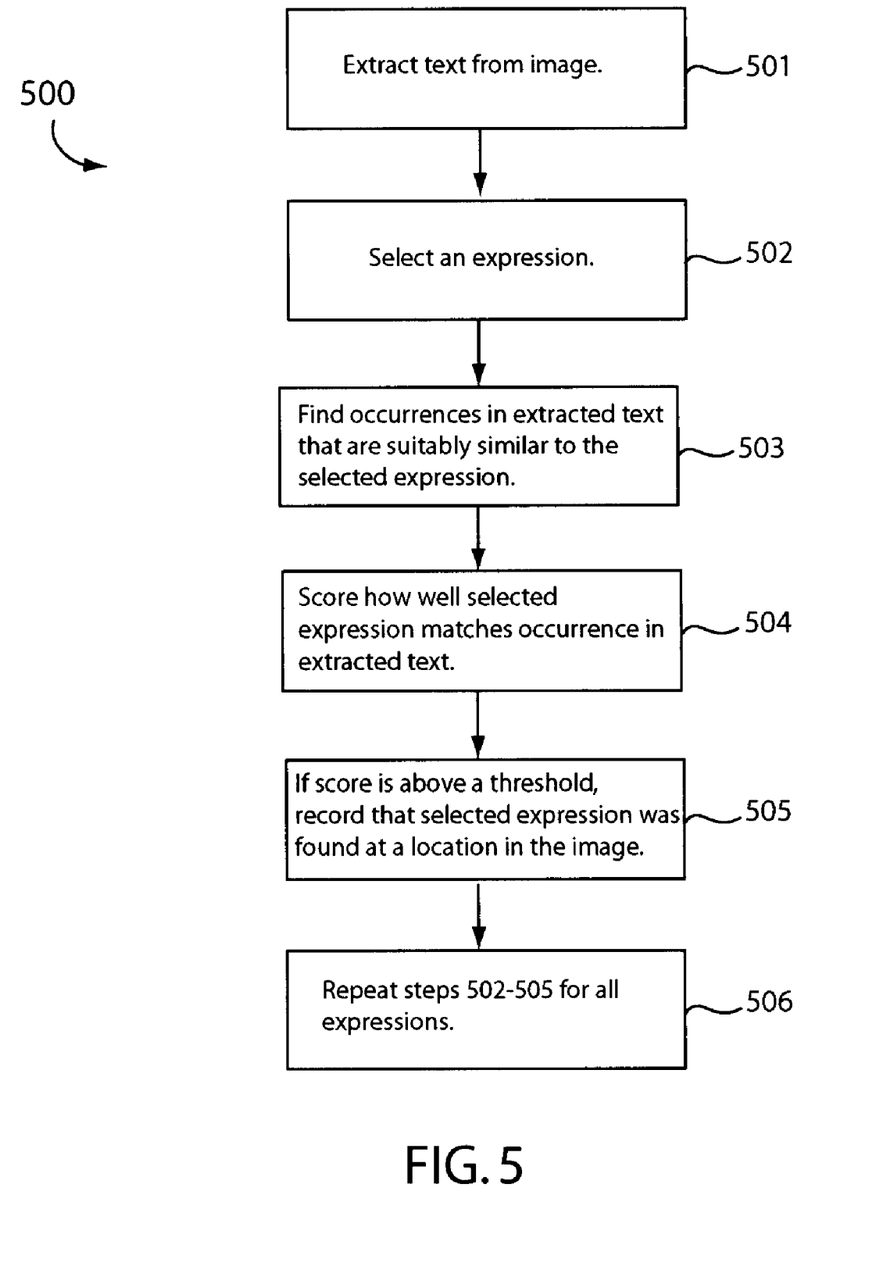
FIG. 5 shows a flow diagram of a method of identifying inappropriate text content in images in accordance with another embodiment of the present invention.

FIG. 5 shows a flow diagram of a method 500 of identifying inappropriate text content in images in accordance with another embodiment of the present invention. FIG. 5 is explained using the components shown in FIG. 3. Other components may also be used without detracting from the merits of the present invention.

The method 500 starts after the antispam engine 320 extracts an image 323 from an email 324. The OCR module 321 then extracts text from the image, hereinafter referred to as "OCR text output" (step 501). The antispam engine 320 selects an expression from the expressions 322 (step 502). Using the selected expression as a reference, the antispam engine 320 finds an occurrence in the OCR text output that is suitably similar to the selected expression 322 (step 503). For example, the antispam engine 320 may find one or more occurrences in the OCR text output that could match the beginning and end of the selected expression 322 in terms of shape. Conventional shape matching algorithms may be employed to perform the step 503. For example, the antispam engine may employ the shape matching algorithm disclosed in the publication "Shape Matching and Object Recognition Using Shape Contexts", S. Belongie, J. Malik, and J. Puzicha., IEEE Transactions on PAMI, Vol 24, No. 24, April 2002. Other shape matching algorithms may also be employed without detracting from the merits of the present invention.

The antispam engine 320 determines the closeness of the selected expression 322 to each found occurrence, such as by assigning a score indicative of how well the selected expression 322 matches each found occurrence in the OCR text output (step 504). For example, the higher the score, the higher the likelihood the selected expression 322 matches the found occurrence. The similarity between the selected expression 322 and a found occurrence may be scored, for example, using the edit distance algorithm or the viterbi algorithm (e.g., see "Using Lexigraphical Distancing to Block Spam", Jonathan Oliver, in Presentation of the Second MIT Spam Conference, Cambridge, Mass., 2005 and "Spam deobfuscation using a hidden Markov model", Honglak Lee and Andrew Y. Ng. in Proceedings of the Second Conference on Email and Anti-Spam (CEAS 2005)). Other scoring algorithms may also be used without detracting from the merits of the present invention.

In the method 500, a minimum threshold indicative of the amount of correspondence required to obtain a match between an expression 322 and a found occurrence may be predetermined. The value of the threshold may be obtained and optimized empirically. If the score of the step 504 is higher than the threshold, the antispam engine 320 may deem the selected expression 322 as being close enough to the occurrence that a match is obtained, i.e., the selected expression 322 is deemed found in the image 323 (step 505). In that case, the antispam engine 320 records that the selected expression was found at the location of the occurrence in the image 323. For each image 323, the antispam engine 320 may repeat the above-described process for each of the expressions 322 (step 506). A separate scoring procedure may be performed for all identified expressions 322 to determine whether or not the image is a spam image. For example, once the expressions 322 present in the image 323 have been identified, the antispam engine 320 may employ conventional text-based algorithms to determine if the identified expressions 322 are sufficient to deem the image 323 a spam image. The email 324 from which a spam image was extracted may be deemed as spam.

Figure 6:
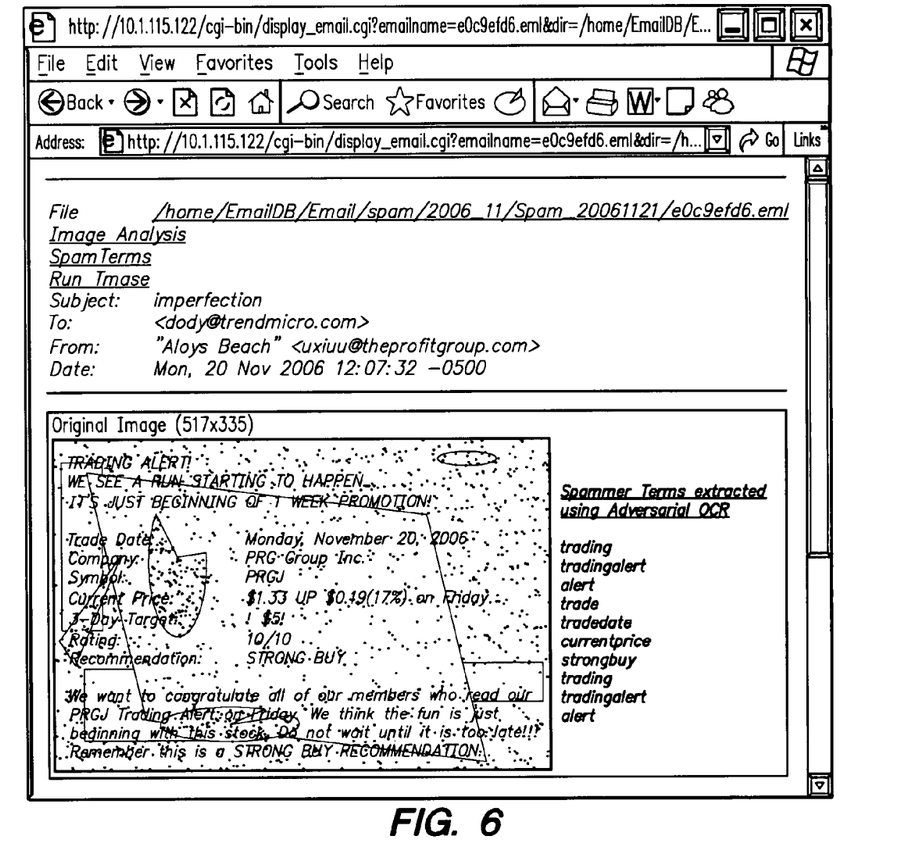
FIG. 6 shows a spam image included in an email and processed using the method of FIG. 5.
Figure 7:
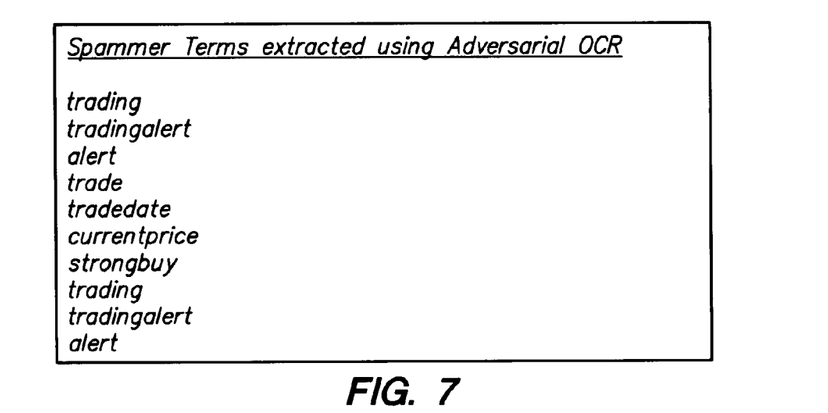
FIG. 7 shows inappropriate text content found in the spam image of FIG. 6 using the method of FIG. 5.

FIG. 6 shows a spam image included in an email and processed using the method 500. FIG. 7 shows the inappropriate text content found by the method 500 on the spam image of FIG. 6. Note that the inappropriate text content, which is included in a list of expressions 322, has been simplified for ease of processing by removing spaces between phrases.

Figure 8:
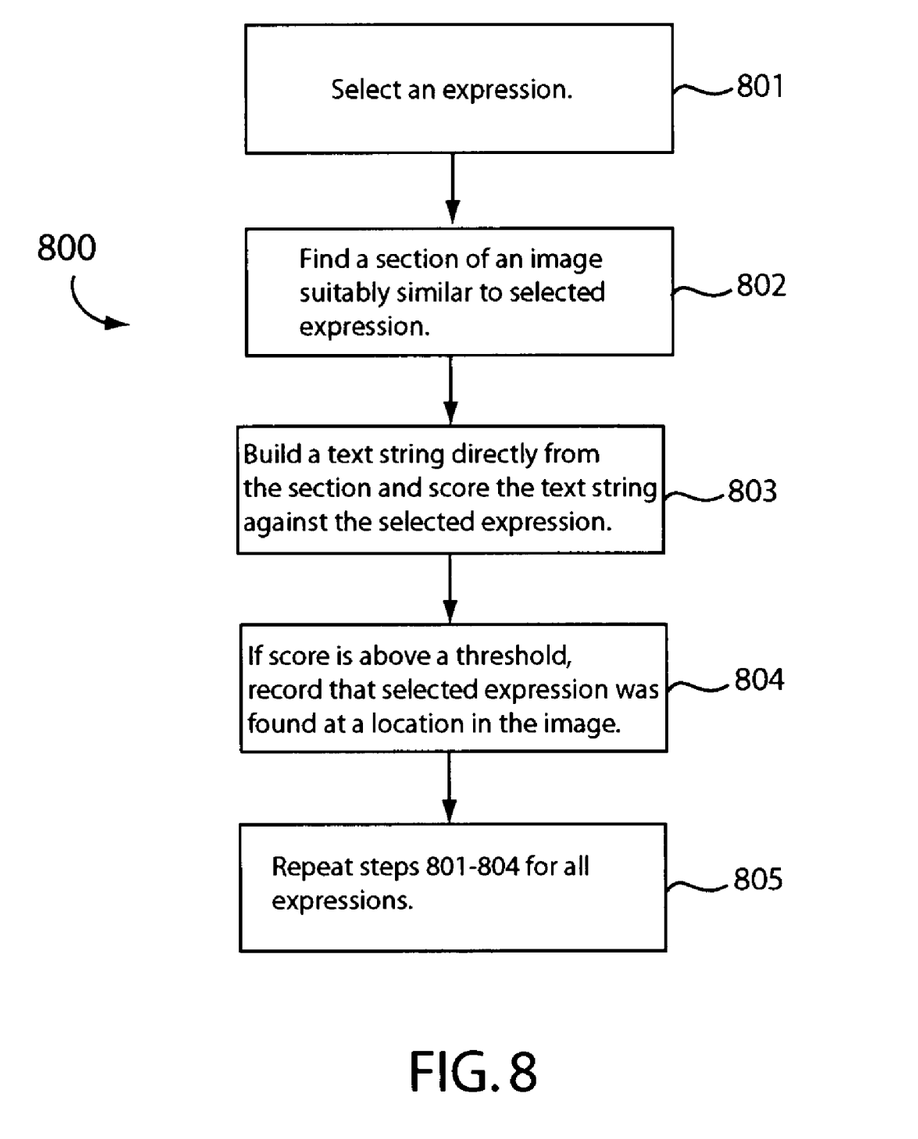
FIG. 8 shows a flow diagram of a method of identifying inappropriate text content in images in accordance with yet another embodiment of the present invention.

FIG. 8 shows a flow diagram of a method 800 of identifying inappropriate text content in images in accordance with yet another embodiment of the present invention. FIG. 8 is explained using the components shown in FIG. 3. Other components may also be used without detracting from the merits of the present invention.

The method 800 starts after the antispam engine 320 extracts an image 323 from an email 324. The antispam engine 320 then selects an expression from the expressions 322 (step 801). The antispam engine 320 finds a section in the image 323 that is suitably similar to the selected expression 322 (step 802). For example, the antispam engine 320 may find a section in the image 323 that could match the beginning and end of the selected expression 322 in terms of shape. A shape matching algorithm, such as that previously mentioned with reference to step 503 of FIG. 5 or other conventional shape matching algorithm, may be employed to perform the step 802.

The antispam engine 320 builds a text string directly (i.e., without first converting the image to text by OCR, for example) from the section of the image and then scores the text string against the selected expression to determine the closeness of the selected expression 322 to the found section (step 803). The higher the resulting score, the higher the likelihood the selected expression 322 matches the section. For example, to identify the text string, the antispam engine 320 may process the section of the image 323 between the potential start and end points that could match the selected expression 322. The pixel blocks in between the potential start and end points (a region of connected pixels) are then assigned probabilities of being the characters under consideration (for example the characters in the ASCII character set). The pixel blocks in between the potential start and end points are then scored using the aforementioned edit algorithm or viterbi algorithm to determine the similarity of the selected expression 322 to the found section.

In the method 800, a minimum threshold indicative of the amount of correspondence required to obtain a match between an expression 322 and a found section may be predetermined. The value of the threshold may be obtained and optimized empirically. If the score of the similarity between the selected expression 322 and the found section of the image 323 is higher than the threshold, the antispam engine 320 may deem the selected expression 322 as being close enough to the found section that there is a match, i.e., the selected expression 322 is deemed found in the image 323 (step 804). In that case, the antispam engine 320 records that the selected expression was found at the location of the section in the image 323. For each image 323, the antispam engine 320 may repeat the above-described process for each of the expressions 322 (step 805). A separate scoring procedure may be performed for all identified expressions 322 to determine whether or not an image is a spam image. For example, once the expressions 322 present in the image 323 have been identified, the antispam engine 320 may employ conventional text-based algorithms to determine if the identified expressions 322 are sufficient to deem the image 323 a spam image. The email 324 from which a spam image was extracted may be deemed as spam.

In light of the present disclosure, those of ordinary skill in the art will appreciate that embodiments of the present invention may be employed in applications other than antispam. This is because the above-disclosed techniques may be employed to identify text content in images in general, the images being present in various types of messages including emails, web page postings, electronic documents, and so on. For example, the components shown in FIG. 3 may be configured for other applications including anti-phishing, identification of confidential information in emails, identification of communications that breach policies or regulations in emails, and other computer security applications involving identification of text content in images. For anti-phishing applications, links to phishing sites may be included in the expressions 322. In that case, the antispam engine 320 may be configured to determine if an image included in an email has text content matching a link to a phishing site included in the expressions 322. Confidential (e.g., company trade secret information or intellectual property) or prohibited (e.g., text content that is against policy or regulation) information may also be included in the expressions 322 so that the antispam engine 320 may determine if such information is present in an image included in an email message.

Improved techniques for identifying inappropriate text content in images have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of identifying inappropriate text content in images, the method to be performed using a computer and comprising:

selecting an expression from a listing of expressions;

extracting an image from a message;

using the selected expression as a reference, finding a section of the image that corresponds to a start point and an end point of the selected expression;

comparing the section of the image to the selected expression to determine how well the section of the image matches the selected expression; and determining if the selected expression is present in the section of the image based on the comparison of the image to the selected expression;

wherein comparing the section of the image to the selected expression comprises assigning, to pixel blocks between the start point and the end point of the section of the image, probabilities of being characters of the selected expression, and further comprising deeming the message as spam based on presence of the selected expression in the section of the image.

2. The method of claim 1 wherein finding the section of the image that corresponds to the start point and the end point of the selected expression comprises:

finding a section of the image that has a shape similar to that of the selected expression.

3. The method of claim 1 wherein comparing the section of the image against the selected expression comprises scoring the image against the selected expression to generate a score.

4. The method of claim 3 wherein determining if the selected expression is present in the section of the image based on the comparison of the image to the selected expression comprises comparing the score to a threshold.

5. The method of claim 4 wherein the selected expression is deemed present in the section of the image when the score is higher than the threshold.

6. The method of claim 1 further comprising performing OCR on the image and wherein the section of the image comprises a text output of the OCR on the image.

7. The method of claim 1 further comprising building a text string representing a text content of the section without performing OCR on the section.

8. The method of claim 7 wherein comparing the section of the image to the selected expression comprises comparing the text string to the selected expression.

9. The method of claim 1 wherein the message comprises an email and the selected expression comprises a word or phrase indicative of spam.

* * * * *